United States Patent
Nakano et al.

(10) Patent No.: US 9,221,017 B2
(45) Date of Patent: Dec. 29, 2015

(54) EXHAUST GAS CONTROL APPARATUS FOR INTERNAL COMBUSTION ENGINE

(75) Inventors: Takanori Nakano, Okazaki (JP); Haruyuki Katayama, Susono (JP); Shinya Hirota, Susono (JP); Shunsuke Toshioka, Susono (JP); Koichiro Fukuda, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/110,895

(22) PCT Filed: Jul. 4, 2011

(86) PCT No.: PCT/JP2011/065278
§ 371 (c)(1),
(2), (4) Date: Oct. 9, 2013

(87) PCT Pub. No.: WO2013/005291
PCT Pub. Date: Jan. 10, 2013

(65) Prior Publication Data
US 2014/0112833 A1  Apr. 24, 2014

(51) Int. Cl.
*B01D 50/00* (2006.01)
*B01D 53/94* (2006.01)
(Continued)

(52) U.S. Cl.
CPC ........ *B01D 53/9459* (2013.01); *B01D 53/9431* (2013.01); *B01D 53/9495* (2013.01); *F01N 3/035* (2013.01); *F01N 3/108* (2013.01); *F01N 3/2066* (2013.01); *F01N 13/008* (2013.01); *F01N 13/009* (2013.01); *F01N 13/0093* (2013.01); *B01D 2251/2067* (2013.01); *B01D 2255/904* (2013.01); *F01N 2560/05* (2013.01); *F01N 2610/02* (2013.01); *Y02T 10/24* (2013.01)

(58) Field of Classification Search
CPC ... F01N 2560/05; F01N 13/009; F01N 3/108; B01D 2251/2067
USPC ............... 422/170, 171, 177, 168; 60/274
See application file for complete search history.

(56) References Cited

U.S. PATENT DOCUMENTS

2007/0122317 A1  5/2007  Driscoll et al.
2007/0163248 A1  7/2007  Miyashita et al.
(Continued)

FOREIGN PATENT DOCUMENTS

DE  102009024782  2/2010
EP  1 306 530  5/2003
(Continued)

*Primary Examiner* — Tom P Duong
(74) *Attorney, Agent, or Firm* — Finnegan, Henderson, Farabow, Garrett & Dunner, LLP

(57) ABSTRACT

The purpose of the present invention is to suppress degradation of a PM sensor and a decrease in detection accuracy of the amount of PM in a configuration in which a urea addition unit and a selective reduction-type NOx catalyst (NOx catalyst) are provided downstream of a particulate filter (filter) in an internal combustion engine exhaust passage, the PM sensor being disposed downstream of the filter. According to the present invention, in an exhaust passage (2) of an internal combustion engine (1), a first NOx catalyst (4) and a second NOx catalyst (5) are disposed downstream of a filter (3) successively from the upstream side along the flow of exhaust. A urea addition unit (6) is disposed between the filter (3) and the first NOx catalyst (4). A PM sensor (7) is disposed between the first NOx catalyst (4) and the second NOx catalyst (5).

2 Claims, 2 Drawing Sheets

(51) Int. Cl.
*F01N 3/10* (2006.01)
*F01N 3/20* (2006.01)
*F01N 3/035* (2006.01)
*F01N 13/00* (2010.01)

(56) References Cited

U.S. PATENT DOCUMENTS

2008/0264042 A1* 10/2008 Khadiya ........................ 60/286
2009/0035194 A1 2/2009 Robel et al.
2009/0266058 A1 10/2009 Kesse et al.
2011/0052454 A1 3/2011 Kato
2012/0227377 A1* 9/2012 Hopka et al. .................... 60/274

FOREIGN PATENT DOCUMENTS

| EP | 1321641 A1 * | 6/2003 |
|---|---|---|
| JP | 8-296430 | 11/1996 |
| JP | 2006-250030 | 9/2006 |
| JP | 2009-270450 | 11/2009 |
| JP | 2010-174657 | 8/2010 |
| JP | 2010-229957 | 10/2010 |
| JP | 2011-52612 | 3/2011 |

* cited by examiner

EXHAUST GAS CONTROL APPARATUS FOR INTERNAL COMBUSTION ENGINE

CROSS-REFERENCE TO RELATED APPLICATIONS

This application is a national phase application of International Application No. PCT/JP2011/065278, filed Jul. 4, 2011, the content of which is incorporated herein by reference.

TECHNICAL FIELD

The invention relates to an exhaust gas control apparatus for an internal combustion engine.

BACKGROUND ART

There has been known an art of providing a particulate filter (hereinafter referred to simply as a filter in some cases), a selective reduction-type NOx catalyst (hereinafter referred to simply as an NOx catalyst in some cases), and the like as an exhaust gas control apparatus in an exhaust passage of an internal combustion engine. The filter collects a particulate matter (hereinafter referred to as a PM in some cases) in exhaust gas that is produced through the combustion of fuel in the internal combustion engine. The NOx catalyst reduces NOx in exhaust gas, using ammonia as a reducing agent.

In Patent Document 1, there is disclosed an art of providing a filter in an exhaust passage of an internal combustion engine and further providing a PM sensor in the exhaust passage downstream of the filter. Besides, it is described in Patent Document 1 that an NOx catalyst is provided in the exhaust passage between the filter and the PM sensor.

In Patent Document 2, there is disclosed an art of providing a first NOx catalyst (a first SCR catalyst) downstream of an oxidation catalyst, providing a second NOx catalyst (a second SCR catalyst) capable of adsorbing more ammonia than the first NOx catalyst downstream of the first NOx catalyst, and further providing urea water supply means upstream of the second NOx catalyst, in a path of exhaust gas.

In Patent Document 3, there is disclosed an art of providing a second catalytic converter that has a larger capacity than a first catalytic converter downstream of the first catalytic converter, and providing an $O_2$ sensor between the first catalytic converter and the second catalytic converter in an exhaust passage.

RELATED ART DOCUMENTS

Patent Documents

Patent Document 1: Japanese Patent Application Publication No. 2010-229957 (JP-2010-229957 A)
Patent Document 2: Japanese Patent Application Publication No, 2011-052612 (JP-2011-052612 A)
Patent Document 3: Japanese Patent Application Publication No. 08-296430 (JP-08-296430 A)

SUMMARY OF THE INVENTION

Problems to be Solved by the Invention

In the case where an NOx catalyst is provided in an exhaust passage, ammonia as a reducing agent needs to be supplied to the NOx catalyst. Thus, there is provided a urea addition unit that adds urea into exhaust gas upstream of the NOx catalyst. Ammonia produced through the hydrolysis of the urea added from the urea addition unit is supplied to the NOx catalyst.

Besides, in the case where a filter is provided in the exhaust passage, a PM sensor may be provided downstream of the filter to detect an amount of the PM that has passed through the filter. The PM sensor is a sensor that detects an amount of the PM in exhaust gas.

It should be noted herein that if the PM sensor is arranged downstream of the urea addition unit in the case where the PM sensor is further provided downstream of the titter in a configuration in which the urea addition unit and the NOx catalyst are provided downstream of the filter in the exhaust passage, water may be poured onto the PM sensor due to the urea added from a urea addition valve. If water is poured onto the PM sensor due to urea, deterioration of the PM sensor may be promoted.

Furthermore, if the urea that has adhered to the PM sensor is heated by exhaust gas, an ammonia derived compound such as biuret, cyanuric acid or the like may be produced. If the ammonia derived compound is produced, the PM sensor may detect the ammonia derived compound as the PM. If the PM sensor detects the ammonia derived compound as the PM, the accuracy in detecting the amount of the PM formed by a fuel component, which is to be intrinsically detected by the PM sensor, may decrease.

The invention has been made in view of the problems as described above. It is an object of the invention to restrain the accuracy in detecting a deterioration in a PM sensor and an amount of a PM from decreasing in the case where the PM sensor is further provided downstream of a filter in a configuration in which a urea addition unit and an NOx catalyst are provided downstream of the filter in an exhaust passage of an internal combustion engine.

Means for Solving the Problems

In the invention, in an exhaust passage of an internal combustion engine, a first NOx catalyst and a second NOx catalyst are provided in this order from an upstream side along the flow of exhaust gas, downstream of a filter. Then, a urea addition unit is provided between the filter and the first NOx catalyst, and a PM sensor is provided between the first NOx catalyst and the second NOx catalyst.

More specifically, an exhaust gas control apparatus for an internal combustion engine according to the invention is equipped with a particulate filter that is provided in an exhaust passage of the internal combustion engine, a first selective reduction-type NOx catalyst that is provided in the exhaust passage downstream of the particulate filter, a second selective reduction-type NOx catalyst that is provided in the exhaust passage downstream of the first selective reduction-type NOx catalyst, a urea addition unit that is provided in the exhaust passage between the particulate filter and the first selective reduction-type NOx catalyst to add urea into exhaust gas, and a PM sensor that is provided in the exhaust passage between the first selective reduction-type NOx catalyst and the second selective reduction-type NOx catalyst to detect an amount of a particulate matter in exhaust gas.

It should be noted herein that the PM sensor may output a signal corresponding to an amount (a flow rate) of the PM in exhaust gas, or may output a signal corresponding to an amount of the PM deposited on itself.

According to the invention, since the first NOx catalyst is arranged between the urea addition unit and the PM sensor, water is unlikely to be poured onto the PM sensor due to urea. Thus, the PM sensor can be restrained from deteriorating.

Besides, according to the invention, since the PM sensor is arranged upstream of the second NOx catalyst, the PM sensor is more likely to be heated up when the PM is oxidized in the filter than in the case where the PM sensor is arranged downstream of the second NOx catalyst. As a result, the ammonia derived compound, which is deposited on the PM sensor, is likely to be removed. Accordingly, the accuracy in detecting the amount of the PM in the PM sensor can be restrained from decreasing.

Furthermore, the PM sensor is more likely to be heated up by exhaust gas than in the case where the PM sensor is arranged downstream of the second NOx catalyst. Thus, the PM sensor can be activated at an earlier stage when the temperature of the PM sensor is lower than its activation temperature as during low-temperature startup or the like.

Besides, in the invention, the heat capacity of the first NOx catalyst may be made smaller than the heat capacity of the second NOx catalyst. Thus, the PM sensor is more likely to be heated up.

Effect of the Invention

According to the invention, the PM sensor can be restrained from deteriorating, and the accuracy in detecting the amount of the PM can be restrained from decreasing in the case Where the PM sensor is further provided downstream of the filter in the configuration in which the urea addition unit and the NOx catalyst are provided downstream of the filter in the exhaust passage.

MODE FOR CARRYING OUT THE INVENTION

A concrete embodiment of the invention will be described hereinafter on the basis of the drawings. The dimensions, materials, shapes of component parts described in this embodiment of the invention, the relative arrangement thereof and the like are not intended to limit the technical scope of the invention thereto unless otherwise specified.

Embodiment

A case where an exhaust gas control apparatus for an internal combustion engine according to the invention is applied to a diesel engine for driving a vehicle will now be described. However, the internal combustion engine according to the invention is not limited to a diesel engine, but may be a gasoline engine or the like.

[Schematic Configuration of Exhaust System]

Figure 1:
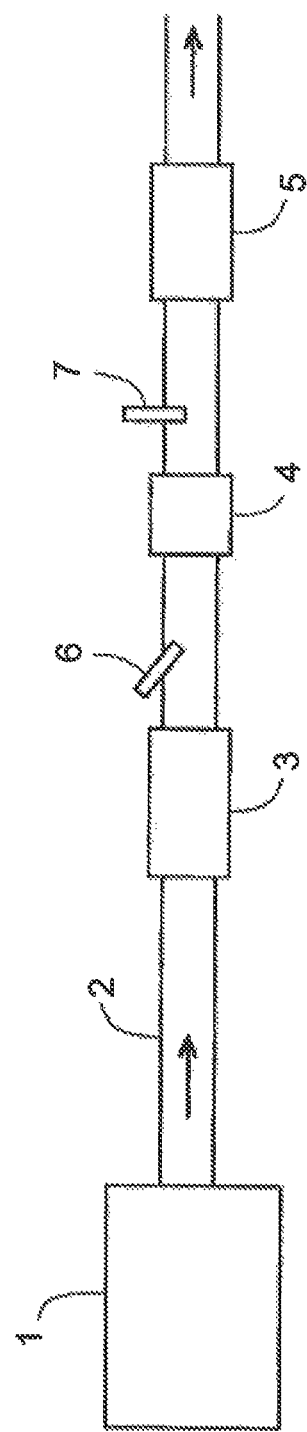
FIG. 1 is a view showing a schematic configuration of an exhaust system of an internal combustion engine according to an embodiment of the invention.

FIG. 1 is a view showing a schematic configuration of an exhaust system of an internal combustion engine according to this embodiment of the invention. An internal combustion engine 1 is a diesel engine for driving a vehicle. An exhaust passage 2 is connected to the internal combustion engine 1. Incidentally, arrows in FIG. 1 represent the direction of flow of exhaust gas.

A filter 3 is provided in the exhaust passage 2. The filter 3 collects a PM in exhaust gas, which is produced through the combustion of fuel in the internal combustion engine 1. Incidentally, a catalyst such as an oxidation catalyst, a storage reduction-type NOx catalyst, a selective reduction-type NOx catalyst or the like may be supported on the filter 3. Due to the collection of the PM by the filter 3, the PM is gradually deposited on the filter 3. When the temperature of the filter 3 has risen to a temperature at which the PM can be oxidized as a result of a rise in the temperature of exhaust gas or the like, the PM deposited on the filter 3 is oxidized. Besides, by performing a so-called filter regeneration treatment to forcibly raise the temperature of the filter 3, the PM deposited on the filter 3 can also be oxidized and removed.

A first selective reduction-type NOx catalyst (a first NOx catalyst) 4 is provided in the exhaust passage 2 downstream of the filter 3. A second selective reduction-type NOx catalyst (a second NOx catalyst) 5 is provided in the exhaust passage 2 downstream of the first NOx catalyst 4. The heat capacity of the first NOx catalyst 4 is smaller than the heat capacity of the second NOx catalyst 5.

A urea addition valve 6 is provided in the exhaust passage 2 between the filter 3 and the first NOx catalyst 4. The urea addition valve 6 adds an aqueous solution of urea into exhaust gas. A urea tank (not shown) in which the aqueous solution of urea is trapped is connected to the urea addition valve 6. The aqueous solution of urea is supplied from the urea tank to the urea addition valve 6. Besides, the urea addition valve 6 is electrically connected to an ECU (not shown) for controlling the internal combustion engine 1, and is controlled by the ECU. Incidentally, in this embodiment of the invention, the urea addition valve 6 is equivalent to the urea addition unit according to the invention.

Due to the addition of the aqueous solution of urea from the urea addition valve 6 into exhaust gas, urea is supplied to the first NOx catalyst 4 and the second NOx catalyst 5. The urea supplied to the first NOx catalyst 4 or the second NOx catalyst 5 is temporarily adsorbed by each of the NOx catalysts 4 and 5. Then, due to the hydrolysis of the adsorbed urea, ammonia is produced. The ammonia serves as a reducing agent to reduce NOx in exhaust gas.

Then, in this embodiment of the invention, a PM sensor 7 that detects an amount of the PM in exhaust gas is provided in the exhaust passage 2 between the first NOx catalyst 4 and the second NOx catalyst 5. The PM sensor 7 is a sensor that outputs an electric signal corresponding to an amount of the PM deposited on itself.

Figure 2:
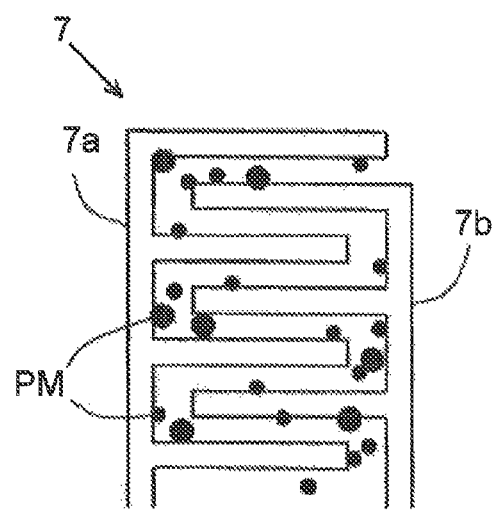
FIG. 2 is a view showing a schematic configuration of a PM sensor according to the embodiment of the invention.
Figure 3:
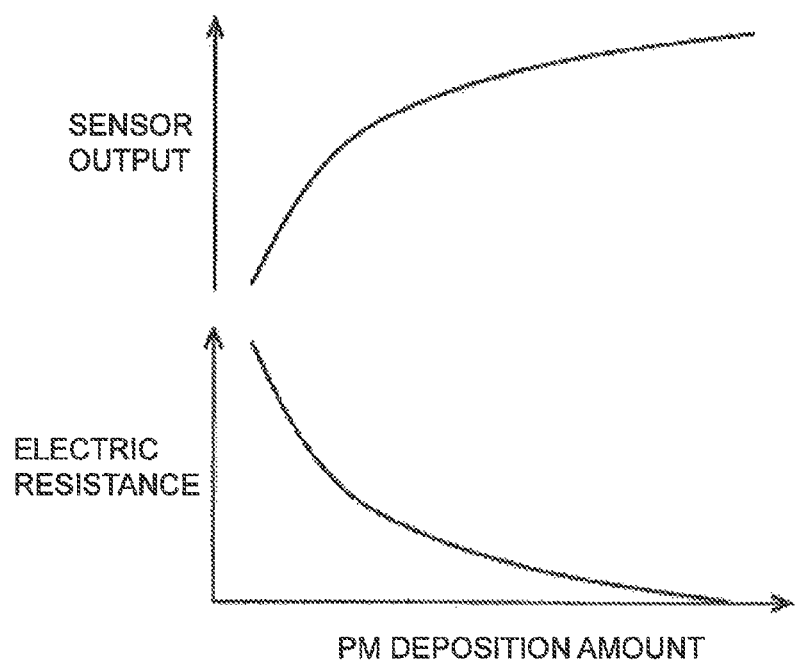
FIG. 3 is a graph showing a relationship among a deposition amount of a PM in a PM sensor, an electric resistance between electrodes of the PM sensor, and an output value of the PM sensor.

It should be noted herein that the details of the PM sensor 7 will be described on the basis of FIGS. 2 and 3. FIG. 2 is a view showing a schematic configuration of a sensor element of the PM sensor 7. FIG. 3 is a graph showing a relationship among a deposition amount of the PM in the PM sensor 7, an electric resistance between electrodes 7a and 7b of the PM sensor 7, and an output value of the PM sensor 7. In FIG. 3, the axis of abscissa represents a deposition amount of the PM in the PM sensor 7, the axis of ordinate on the lower stage represents an electric resistance between the electrodes 7a and 7b of the PM sensor 7, and the axis of ordinate on the upper stage represents an output value of the PM sensor 7.

As shown in FIG. 2, the sensor element of the PM sensor 7 has a pair of the comb tooth-type electrodes 7a and 7b. The PM in exhaust gas adheres to the PM sensor 7, and the adherent PM is gradually deposited. As the deposition amount of the PM in the PM sensor 7 increases, the amount of the PM present between the electrodes 7a and 7b increases.

Thus, as shown in FIG. 3, as the deposition amount of the PM in the PM sensor 7 increases, the electric resistance between the electrodes 7a and 7b decreases. Then, as the electric resistance between the electrodes 7a and 7b decreases, the output value of the PM sensor 7 increases. Accordingly, the output value of the PM sensor 7 assumes a value corresponding to the deposition amount of the PM in the PM sensor 7.

Besides, the PM sensor 7 is provided downstream of the filter 3. Thus, the PM that has passed through the filter 3 instead of being collected by the filter 3 is collected by the PM sensor 7. Accordingly, the deposition amount of the PM in the PM sensor 7 is an amount corresponding to an integrated value of the amount of the PM that has passed through the filter 3.

The PM sensor 7 is electrically connected to the ECU, and an output signal of the PM sensor 7 is input to the ECU. A diagnosis on a malfunction of the filter 3 is carried out in the ECU on the basis of the output value of the PM sensor 7. In the case where a malfunction of the filter 3 such as breakage, erosion or the like occurs, the amount of the PM passing through the filter 3 increases in comparison with the case where the filter 3 is in a normal state. Thus, if the change in the output value of the PM sensor 7 during a predetermined period has exceeded a predetermined threshold, the ECU determines that a malfunction of the filter 3 has occurred.

Incidentally, if the amount of the PM present between the electrodes 7a and 7b changes, the electric characteristic value other than the electric resistance, such as a current flowing between the electrodes 7a and 7b or the like, also changes. Thus, the PM sensor 7 may output a signal corresponding to the amount of the PM deposited on itself, on the basis of the electric characteristic value other than the electric resistance. Furthermore, the PM sensor according to the invention is not limited to a sensor that outputs a signal corresponding to an amount of the PM deposited on itself, but may be a sensor that outputs a signal corresponding to an amount (a flow rate) of the PM in exhaust gas.

[Effect of Configuration According to this Embodiment]

In the case where the PM sensor is provided downstream of the urea addition valve in the exhaust passage, water may be poured onto the PM sensor due to the aqueous solution of urea added from the urea addition valve. However, in this embodiment of the invention, the first NOx catalyst 4 is arranged between the urea addition valve 6 and the PM sensor 7. According to this configuration, water is unlikely to be poured onto the PM sensor 7 due to the aqueous solution of urea. Accordingly, the PM sensor 7 can be restrained from deteriorating.

Besides, if the urea that has adhered to the PM sensor 7 is heated by exhaust gas, the ammonia derived compound (bi-uret, cyanuric acid or the like) may be produced. If such an ammonia derived compound is produced in the PM sensor 7, the PM sensor 7 may detect the ammonia derived compound as the PM. That is, the ammonia derived compound as well as the PM formed by the fuel component is deposited on the PM sensor 7, whereby the electric resistance between the electrodes 7a and 7b becomes lower than in the case where only the PM is deposited. As a result, the PM sensor 7 may output a value larger than the deposition amount of the PM in the PM sensor 7. In this manner, if the PM sensor 7 detects the ammonia derived compound as the PM, the accuracy in detecting the amount of the PM formed by the fuel component, which is to be intrinsically detected by the PM sensor 7, may decrease.

It should be noted herein that even in the case where the PM sensor 7 is provided in the exhaust passage 2 downstream of the second NOx catalyst 5, water can be restrained from being poured onto the PM sensor 7 due to the aqueous solution of urea added from the urea addition valve 6. However, in the case where the PM sensor 7 is arranged in the exhaust passage 2 upstream of the second NOx catalyst 5 as in this embodiment of the invention, the PM sensor 7 is more likely to receive heat generated during oxidation of the PM in the filter 3 than in the case where the PM sensor 7 is arranged in the exhaust passage 2 downstream of the second NOx catalyst 5. Thus, the PM sensor 7 is likely to be heated up.

If the PM sensor 7 is heated up, the ammonia derived compound that has been deposited on the PM sensor 7 is oxidized and removed. That is, in the case where the PM sensor 7 is arranged in the exhaust passage 2 upstream of the second NOx catalyst 5, the ammonia derived compound that has adhered to the PM sensor 7 is more likely to be removed than in the case where the PM sensor 7 is arranged in the exhaust passage 2 downstream of the second NOx catalyst 5.

Furthermore, in this embodiment of the invention, the heat capacity of the first NOx catalyst 4 is smaller than the heat capacity of the second NOx catalyst 5. Thus, when the PM is oxidized in the filter 3, the PM sensor 7 is more likely to be heated up. Thus, the removal of the ammonia derived compound that has adhered to the PM sensor 7 is further promoted.

Accordingly, the configuration according to this embodiment of the invention makes it possible to restrain the accuracy in detecting the amount of the PM in the PM sensor 7 from decreasing. As a result, a false diagnosis can also be restrained from being made in a diagnosis on a malfunction of the filter 3 as described above.

Besides, in the case where the PM sensor 7 is arranged in the exhaust passage 2 upstream of the second NOx catalyst 5, the PM sensor 7 is more likely to be heated up by exhaust gas than in the case where the PM sensor 7 is arranged in the exhaust passage 2 downstream of the second NOx catalyst 5. Furthermore, since the heat capacity of the first NOx catalyst 4 is smaller than the heat capacity of the second NOx catalyst 5, the heating up of the sensor 7 by exhaust gas is also more likely to be promoted, as in the case where the PM sensor 7 is heated up due to the oxidation heat of the PM. Accordingly, the configuration according to this embodiment of the invention makes it possible to activate the PM sensor 7 at an earlier stage when the temperature of the PM sensor 7 is lower than its activation temperature as during low-temperature startup or the like.

DESCRIPTION OF REFERENCE NUMERALS

1 . . . INTERNAL COMBUSTION ENGINE
2 . . . EXHAUST PASSAGE
3 . . . PARTICULATE FILTER
4 . . . FIRST SELECTIVE REDUCTION-TYPE NOx CATALYST
5 . . . SECOND SELECTIVE REDUCTION-TYPE NOx CATALYST
6 . . . UREA ADDITION VALVE
7 . . . PM SENSOR

The invention claimed is:

1. An exhaust gas control apparatus for an internal combustion engine, comprising:
 a particulate filter that is provided in an exhaust passage of the internal combustion engine;
 a first selective reduction-type NOx catalyst that is provided in the exhaust passage downstream of the particulate filter;
 a second selective reduction-type NOx catalyst that is provided in the exhaust passage downstream of the first selective reduction-type NOx catalyst;

a urea addition unit that is provided in the exhaust passage between the particulate filter and the first selective reduction-type NOx catalyst to add urea into exhaust gas; and a PM sensor that is provided in the exhaust passage between the first selective reduction-type NOx catalyst and the second selective reduction-type NOx catalyst to detect an amount of a particulate matter in exhaust gas.

2. The exhaust gas control apparatus for the internal combustion engine according to claim 1, wherein a heat capacity of the first selective reduction-type NOx catalyst is smaller than a heat capacity of the second selective reduction-type NOx catalyst.

\* \* \* \* \*